United States Patent [19]

Roosen et al.

[11] Patent Number: 4,987,043
[45] Date of Patent: Jan. 22, 1991

[54] METHOD FOR THE PRODUCTION OF A MULTICOLOR FILTER ARRAY

[75] Inventors: Raymond A. Roosen, 's-Gravenwezel; Marcellus H. De Meyer, Edegem; Wilhelmus Janssens, Aarschot, all of Belgium

[73] Assignee: Agfa-Gevaert, N.V., Mortsel, Belgium

[21] Appl. No.: 346,408

[22] Filed: May 2, 1989

[30] Foreign Application Priority Data

May 10, 1988 [EP] European Pat. Off. ............ 88200920

[51] Int. Cl.$^5$ ............................................. G03C 7/12
[52] U.S. Cl. ........................................ 430/7; 430/213; 430/237; 430/364
[58] Field of Search ................... 430/7, 213, 237, 364

[56] References Cited

U.S. PATENT DOCUMENTS

| | | | |
|---|---|---|---|
| 3,625,691 | 12/1971 | Ohyama et al. | 430/213 |
| 4,271,246 | 6/1981 | Sato et al. | 430/7 |
| 4,386,143 | 5/1983 | Sato et al. | 430/7 |
| 4,565,756 | 1/1986 | Needs et al. | 430/7 |

Primary Examiner—Richard L. Schilling
Attorney, Agent, or Firm—A. W. Breiner

[57] ABSTRACT

Method for the production of a multicolor filter array wherein individual color pixels are delineated by a light absorbing contour pattern, which method comprises the steps of:

(a) providing a photosensitive dye receptor material being a photographic silver halide emulsion material incorporating at least one waterpermeable silver halide emulsion layer on a support and containing optionally a mordanting agent suited for fixing dyes in said silver halide emulsion layer and/or in another layer in waterpermeable relationship therewith, (2) depositing pixelwise different dyes or dye precursors compounds wherefrom dyes can be formed by chemical reaction on said photosensitive dye receptor material, (3) photo-exposing said at least one silver halide emulsion layer of said dye receptor material to a light pattern resulting in a latent image in the form of a contour line pattern delineating the individual color pixels obtained in said dye receptor material, and (4) developing said latent image to form in said dye receptor material an image representing a light-absorbing contour line pattern delineating the individual color pixels.

12 Claims, 1 Drawing Sheet

METHOD FOR THE PRODUCTION OF A MULTICOLOR FILTER ARRAY

DESCRIPTION

This invention relates to a method and materials for the manufacture of multicolour and mosaics by silver halide photochemistry.

Multicolour filter arrays have become of interest in the production of full-colour photo-sensors and electronic displays such as full-colour liquid crystal display devices.

In full-colour liquid crystal devices a layer of liquid crystals in conjunction with a multicolour filter array or mosaic is used wherein each coloured element (red green or blue coloured element) of the filter is associated with a liquid crystal layer acting as light-shutter element that can be electronically modulated in light-transmitting or light-blocking state obtaining thereby a multicolour light pattern.

For example, a common full-colour liquid crystal display device has a pair of opposed glass plates and electrode groups on one of the glass plates, wherein the electrode groups are combined with voltage applying means for selectively applying thereto a voltage with respect to a common electrode. The common electrode is applied to the opposed glass plate which has been pre-coated with a multicolour filter array. In the interspace formed between the electrode groups and the common electrode a liquid crystal layer is present.

In an already classical embodiment a liquid crystal display (LCD) device operates with polarized light and for that purpose polarizer layers are arranged as outermost layers having the liquid crystal layer inbetween. The molecular arrangement of the liquid crystals has an influence on the rotation of the light polarization plane.

Liquid crystals of the nematic type are orientated in a spiral staircase pattern between non-energized electrode structures by means of aligning layers covering the electrodes. In the twisted nematic state polarized light (polarized by the first polarizer layer) can pass through the second polarizer layer being in crossed position with respect to the first polarizer. By applying an electric field the twisted state is cancelled and the crystals orientate in the direction of the field whereby rotation of the polarization plane no longer takes place and transmission of polarized light by the second polarizer layer is blocked.

In active matrix addressing LCD panels each colour area, also called colour pixel, has its own integrated switching means such as a thin film transistor (TFT) or a diode. These switching means are arrayed in a matrix pattern on one of the glass plates. Transmission of light through a red, green or blue filter mosaic area is achieved by de-energizing the corresponding electrode pixel influencing the light-transmission of the interpositioned liquid crystal layer. An example of a full-colour LCD (liquid crystal display) is given in the journal Society of Information Displays (SID) 86 Digest by Yasuhiro Nasu et al., in the article "Color LCD for Character and TV Display Addressed by Self-Aligned a-Si:H TFT", FIG. 7 on p. 291.

Several techniques are known for the production of multicolour filter arrays some of them being based on the use of photo-resist layers and dyeing techniques as described e.g. in U.S. Pat. No. 4,565,756 other being based on silver halide colour photography using colour development operating with colour couplers as described e.g. in U.S. Pat. No. 4,271,246.

According to the last mentioned U.S. patent the production of a multicolour optical filter comprises exposing a photographic material comprising a support and at least one black-and-white silver halide emulsion layer to light through a first pattern; developing the exposed emulsion layer with a first colour coupler containing colour developer to form a pattern of a first dye; then exposing an unexposed portion of said emulsion layer to light through a second pattern, developing the exposed area with a second colour coupler containing colour developer to form a pattern of a second dye; optionally repeating exposure and development to form patterns containing dyes of third and subsequent colours, thereby to form colour patterns of at least two colours; and subjecting the product to a silver removal treatment after the final colour development step.

In FIG. 8 of said U.S. Pat. No. 4,271,246 a multicolour optical filter consisting of individual colour areas touching each other is shown.

Sharp pixel areas are produced but such in a time consuming procedure including several register exposures and need of several different photographic processing liquids with each their different colour forming ingredients which makes the process less suited for mass production.

A convenient alternative for producing colour arrays and mosaics containing a plurality of colour pixels would be provided by a dye diffusion transfer process wherein dye compounds or precursors thereof during development of superposed image-wise exposed light-sensitive silver halide emulsion layers diffuse into a silverfree receiving layer wherein the dyes are fixed by a mordanting agent.

Although the dye diffusion transfer process gives a convenient and very rapid access to a multicolour dye image by using only one processing liquid it has the inherent disadvantage of yielding an image the sharpness of which is not as high as obtained in classical colour development. Such is due to lateral diffusion of dyes during the diffusion transfer which gives rise in the receptor material to line broadening and a non-equal colour density over a given line width. Hereby colour density at the border of a pixel is less than at the center which results in a reduced image sharpness and less contrasty image reproduction.

Other methods that would be suited for pixelwise deposition of dyes to form a multicolour array or mosaic are printing methods. For example pixelwise dye deposition could proceed by classical printing including letterpress, gravure printing, offset printing and screen printing or non-impact printing. Non-impact printing techniques are described e.g. in the book "Principles of Non Impact Printing" by Jerome L. Johnson-Palatino Press-Irvine-U.S.A. (1986).

Particularly convenient non-impact printing techniques for a pixelwise deposition of dyes are ink-jet printing and thermal transfer printing. A particular type of ink jet printing known as deflected ink jet printing has the capability to give a resolution of 19 dots per mm and thermal transfer has the capability to give a resolution of 16 dots per mm but these techniques can still not compete with the image sharpness and acutance that can be obtained by development of fine grain silver halide emulsion layers.

It has now been found that the application of a light-absorbing contour line dissimulating some of the border part of each colour pixel having some lateral colour spread remedies for a poor image sharpness.

The application of an opaque border line delineating the individual colour pixels in LCD panels has the further advantage that it ensures maximum contrast, because it blocks the light that could escape through the spaces between adjoining picture elements.

Applied in active matrix driving LCD panels an opaque border line has also the advantage of dissimulating (masking) the thin film transistors (TFT) positioned in such panel at a border line of each individual pixel electrode in front of a corresponding colour filter pixel. Since TFT's on the basis of amorphous silicon (a-Si:H) or CdSe are photoconductive, light from the exterior will influence their switching capacity which has to be avoided. A practical embodiment of an active matrix driving multicolour LCD panel containing TFT arrays on silicon basis wherein a liquid crystal layer is present between pixel electrodes and a common electrode that is applied to colour filter pixels is illustrated in Optical Engineering May/June 1984 Vol. 23 No. 3 p. 244, FIG. 7 and 10.

It is an object of the present invention to provide a method for the manufacture of a multicolour filter array wherein individual colour pixels formed by pixelwise dye deposition. e.g. by pixelwise dye diffusion transfer, are delineated in a convenient and accurate way by a light-absorbing contour line pattern forming a light-impervious separation region between the pixel areas and being very narrow as compared with the individual colour pixel elements.

It is an other object of the present invention to provide a photographic material suited for carrying out said method.

It is a further object of the present invention to provide a liquid crystal display device containing a multicolour filter array wherein individual colour pixels are delineated by a light-absorbing contour line pattern.

Other objects and advantages of the present invention will become apparent from the further description and drawings.

The present invention provides a method for the production of a multicolour filter array or mosaic wherein individual colour pixels are delineated by a light absorbing contour pattern, which method comprises the steps of :

(1) providing a photosensitive dye receptor material being a photographic silver halide emulsion material incorporating at least one waterpermeable silver halide emulsion layer on a support optionally containing a mordanting agent suited for fixing dyes in said silver halide emulsion layer and/or in another layer in waterpermeable relationship therewith, (2) depositing pixelwise different dyes or dye precursor compounds onto said photosensitive dye receptor material, (3) photo-exposing said at least one silver halide emulsion layer of said photosensitive dye receptor material to a light pattern resulting in a latent image in the form of a contour line pattern delineating the individual colour pixels obtained by deposition of said dyes on said photosensitive dye receptor material, and (4) developing said latent image to form in said dye receptor material an image representing a light-absorbing contour line pattern delineating the individual colour pixels obtained by deposition of said dyes in said dye receptor material.

By dye precursors is understood colourless compounds that by chemical reaction are transformable into dyes, e.g. colour couplers that on coupling with a chemical reagent form a dye. e.g. azo dye, quinonimine dye or azomethine dye, or leuco dye compounds that are transformed from colourless state in coloured state by oxidation or acidification.

The invention is illustrated by the accompanying drawings.

Figure 1:
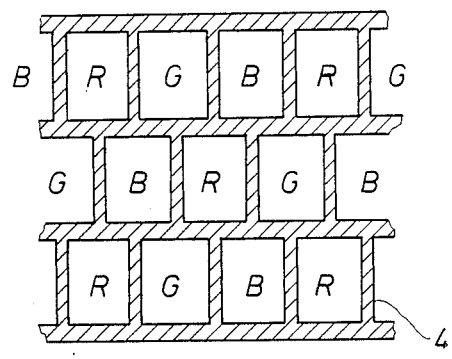
FIG. 1 represents a top view of a multicolour pixel array containing a light-absorbing contour line pattern produced according to the present invention.

In a preferred embodiment according to the present invention mordantable dyes are deposited pixelwise by a dye diffusion transfer processing including the steps of contacting the layer(s) of said photosensitive dye receptor material containing a mordanting agent(s) with a pixelwise exposed dye diffusion transfer material comprising a plurality of differently spectrally sensitized silver halide emulsion layers each of which is associated with a different dye-releasing compound the dye release and diffusion transfer of released dye is controlled by the development in alkaline aqueous medium of pixelwise photo-exposed silver halide in said dye diffusion transfer material.

A survey of practically useful dye diffusion transfer processes, materials and ingredients is given by Christian C. Van de Sande in Angew.Chem.Int.Ed.Engl. 22 (1983) 191–209 and in Research Disclosure item 15162 (November 1976).

Dye releasing compounds for use in a dye diffusion transfer process are diffusion resistant compounds wherefrom by chemical reaction controlled by silver halide development of a negative working or direct-positive working silver halide emulsion layer diffusible dye moieties can be split off. Said dye moieties are selected e.g. from the group of triphenylmethane, xanthene, azo, azomethine, anthraquinone, alizarine, merocyanine, quinoline or cyanine dyes.

Preferred dye moieties contain at least one azo chromophore the light stability of which can be improved e.g. by complexation with metal ions. e.g. nickel (II) ions as decribed e.g. in U.S. Pat. Nos. 4,207,104 and 4,357,412.

The dye release is controlled by a redox reaction taking place during the silver halide development. The dye release can be the result of hydrolysis taking place in aqueous alkaline medium following an oxidation or reduction of dye releasing compounds.

Oxidizable dye-releasing compounds that after oxidation release a dye moiety by hydrolysis are known, e.g., from DE-A No. 2,242,762. DE-A No. 2,406,664, DE-A No. 2,505,246, DE-A No. 2,613,005, DE-A No. 2,645,656 (DE-A stands for German Auslegeschrift) and Research Disclosure publications Nos. 15,157 (November 1976), 16,654 (April 1977) and 17,736 (January 1979).

In these references dye-releasing compounds are described in which the dye moiety is linked most frequently through a sulphonamido group to an oxidizable carrier moiety, called ballast group. The dye released from such compounds contains a sulphamoyl group (anionic group).

Oxidizable dye-releasing compounds which in oxidized form release a dye moiety by intramolecular displacement reaction are described, e.g., in U.S. Pat. No. 3,443,940. The dye released from these compounds contains a sulphinate group (anionic group).

Oxidizable dye-releasing compounds that in oxidized form are stable but in reduced state set free a dye moiety by an elimination reaction are described in DE-A No. 2,823,159 and DE-A No. 2,854,946. Compounds of that type when used in reduced form in an unexposed silver halide emulsion material are called IHO-compounds wherein IHO is the acronym for "inhibited hydrolysis by oxidation". When used in the oxidized form these compounds are called IHR-compounds, wherein IHR is the acronym for "increased hydrolysis by reduction".

Reducible dye-releasing quinonoid compounds which after reduction can undergo a dye release with an intermolecular nucleophilic displacement reaction are described in DE-A No. 2,809,716 wherein these compounds are called BEND-compounds BEND standing for "Ballasted Electron-accepting Nucleophilic Displacement".

Reducible dye-releasing quinonoid compounds which after reduction by residual developing agent can undergo a dye release with an elimination reaction are described e.g. in the published EP-A Nos. 0,004,399 and 0 173 361 and in U.S. Pat. No. 4,371,604.

Other classes of compounds that may release a dye after reduction are described in DE-A No. 3,008,588 and DE-A No. 3,014,669.

It is particularly interesting in dye diffusion transfer to operate with dye-releasing compounds the dye release from which is inversely proportional to the development of a negative-working silver halide emulsion layer and whereby positive dye images can be formed in a receptor material. Such dye releasing compounds are the above defined reducible IHR-compounds.

The formation of colour pixels in the primary colours: blue, green and red in one dye receptor layer is possible by using cyan dye, magenta dye and yellow dye releasing compounds which by proper mixing according to the principles of subtractive colour photography form individual pixels having one of said primary colours.

The production of colour filter arrays comprising red, green, and blue filter pixels by means of superposed filter layers comprising magenta, cyan and yellow filter pixels obtained by classical colour development of exposed silver halide is described in published European patent application No. 0 249 991.

In the process of the present invention for the production of a multicolour pixel array preferably a multicolour dye diffusion transfer material is used that comprises a support carrying (1) a red-sensitive silver halide emulsion layer having operatively associated therewith a dye-releasing compound that is initially immobile in an alkali-permeable colloid medium and wherefrom through the reducing action of a silver halide developing agent and alkalinity a cyan dye is split off in diffusible state, (2) a green-sensitive silver halide emulsion layer having operatively associated therewith a compound wherefrom a magenta dye is split off in diffusible state, and (3) a blue-sensitive silver halide emulsion layer having operatively associated therewith a compound wherefrom a yellow dye is split off in diffusible state. Examples of such materials are described in published EP-A No. 0 004 399, 0 038 092, 0 109 701 and in U.S. Pat. Nos. 4,273,855 and 4,605,613.

The image acutance of colour pixels produced by dye diffusion transfer is advantageously influenced by the use of fine grain silver halide reducing the granularity of the dye deposition in the individual spots or pixels.

A photosensitive dye receptor material according to the present invention for use in a dye diffusion transfer processing comprises a silver halide emulsion layer, preferably only one silver halide emulsion layer, on a support, preferably a glass base, and contains in said layer and/or in a layer in water-permeable relationship therewith at least one mordanting agent for fixing mordantable dyes.

In a photosensitive dye receptor material according to the present invention the silver halide may be of any type known in the art, examples of which are described in Research Disclosure of December 1978. item 17643.

For high resolution imaging preference is given to fine grain silver halide as contained in Lippmann type emulsions wherein the average grain size of the silver halide is at most 0.1 micron. Details about the preparation of Lippmann emulsions can be found in the book of P. Glafkidès-"Photographic Chemistry", Vol. 1-Fountain Press London (1958), p. 365-368 and The Journal of Photographic Science, Sept./Oct. Vol. 35, No. 5, p. 150-154. Lippmann emulsions are advantageously prepared in the presence of silver halide grain growth restrainers, e.g. those described in U.S. Pat. No. 3,501,313, 3,661,592, 3,704,130, 3,825,426, 3,847,617 and 4,202,695 and also in the Research Disclosure No. 9401 of Product Licensing Index, February 1972.

With Lippmann type emulsion layers patterns with excellent acutance and resolving power suited for use in the manufacture or in combination with micro-electronic devices or elements can be formed. For further improved image sharpness a Lippmann type silver halide emulsion contains light-screening dyes, e.g. as described in U.S. Pat. No. 3,652,280 and in Belgian Patent (BE-P) No. 699,375.

The spectral sensitization of the silver halide, if thereto is a need, may proceed with spectral sensitizing dyes for silver halide known to those skilled in the art. The spectral sensitization of Lippmann emulsions may be carried out as described e.g. in published French Patent Application No. 2,028,720.

In a dye receptor material according to the present invention the mordanting agent being present in the waterpermeable silver halide emulsion layer and/or in an other hydrophilic colloid emulsion layer in water-permeable relationship therewith is an ionic, preferably a diffusion resistant polymeric ionic compound, whereto an anionic or cationic dye can be fixed.

Cationic dyes are fixed to anionic mordanting agents and anionic or acid dyes are fixed to cationic or basic mordanting agents.

In commercially applied dye diffusion transfer processes anionic dyes are released that are fixed in a hydrophilic colloid layer containing a cationic mordanting agent.

Examples of suited basic or cationic mordants are polymers of amino-guanidine derivatives of vinyl methyl ketone such as described in U.S. Pat. No. 2,882,156, and basic polymeric mordants and derivatives, e.g. poly-4-vinylpyridine.

Particularly suited mordanting agents for anionic dyes in a gelatin binder layer are polymers containing onium groups, e.g. quaternary ammonium or phosphonium groups or ternary sulphonium groups. Examples thereof are the metho-p-toluene sulphonate of 2-vinylpyridine and similar compounds described in Research Disclosure, November 1976, item 15162.

Preferred mordanting agents for use in a gelatin binder medium whereto they are linked chemically are the cationic polyurethane polymers containing free glycidyl groups described in U.S. Pat. No. 4,186,014.

Other suitable mordanting polymers include e.g. guanylhydrazone derivatives of acyl styrene polymers, as described, e.g., in published DE-A No. 2,009,498.

Still other effective mordanting agents are long-chain quaternary ammonium or phosphonium compounds or ternary sulphonium compounds, e.g. those described in U.S. Pat. Nos. 3,271,147 of Walter M. Bush and 3,271,148 of Keith E. Whitmore, both issued Sept. 6, 1966, and cetyltrimethyl-ammonium bromide. Certain metal salts and their hydroxides that form sparingly soluble compounds with the acid dyes may be used too.

The dye mordants are dispersed in one of the usual hydrophilic colloid binders applied in photographic silver halide emulsion materials, preferably in gelatin. Other binders that may be used are poly-N-vinylpyrrolidinone or partly or completely hydrolysed cellulose esters.

In the embodiment of the present invention wherein dye deposition takes place by dye diffusion transfer from a multicolour dye diffusion transfer material the pixel-wise exposure of the multicolour dye diffusion transfer material may be a contact exposure or a projection exposure using a lens type system for focussing purposes.

According to a first embodiment the exposure of the multicolour dye diffusion transfer material proceeds in a single step through a multicolour pixel pattern containing a mosaic of blue, green and red pixels prepared as described e.g. in U.S. Pat. Nos. 4,271,246 or 4,565,756.

According to a second embodiment the exposure of the multicolour dye diffusion transfer material proceeds in three steps using a shiftable mask, wherein in a first step a pattern-wise exposure is made through said mask having apertures corresponding with the areas that are intended for dye release in dye diffusion transfer processing for recording one primary colour, e.g. blue, and for the following two exposures intended for recording successively the two other primary colours, green and red after recording of blue, the mask is shifted each time in one direction within a distance corresponding with the length of one side of the aperture plus optionally the width of a contour line so that in the successive exposures adjacent areas are exposed so that finally in a one step dye diffusion transfer processing a mosaic pattern of blue, green and red pixel areas is produced in the photosensitive dye receptor material.

According to a third embodiment for each exposure a different mask is used and the different exposures are carried out in register with respect to the photographic dye diffusion transfer material to obtain after the different exposures by a one step dye diffusion transfer processing in the photosensitive dye receptor material a desired pattern of differently coloured areas being directly adjacent to each other or separated by a more or less wide contour line having no colour.

The production according to the present invention of a light-absorbing contour line pattern delineating the different colour pixels proceeds by exposing in the photosensitive dye receptor material the silver halide emulsion layer that contains or stands in waterpermeable relationship with a mordanting agent with a light pattern corresponding with the intended contour line pattern and developing the obtained latent image.

Since by lateral diffusion of the dyes in said receptor element the drop in optical density is the highest at the border of a pixel area the pixelwise exposure or exposures of the photographic dye diffusion transfer material is (are) made advantageously through a mask having larger apertures than the intended pixel areas whereby on covering (masking) a certain width of the border part of each colour pixel with the light absorbing contour line a central zone of more equal colour density is left free.

In some embodiments the contour lines of the contour line pattern have a width corresponding with a 1/5 to 1/10 of a pixel side.

The development of the contour line pattern in the photographic receptor element of the present invention may be a black-and-white or colour development known in the art of silver halide photography.

By black-and-white development, e.g. with hydroquinone and/or other developing agents suited therefor, a light-absorbing contour line pattern containing silver particles is obtained.

By colour development in the presence of colour coupler(s) a silver metal pattern congruent with a dyestuff pattern is obtained. The dyestuff pattern may be composed of a mixture of dyes so as to form black. In the latter case the silver can be removed by bleaching and fixing whereby the electric conductivity of the contour line pattern is reduced. Such may be interesting in applications wherein the multicolour filter array could interfere with electronic circuitry and give rise to current leaks.

In order to protect the hydrophilic colloid layer(s) of the finally obtained multicolour filter array against damage and penetration of moisture a protective water-impermeable layer may be applied thereto. Such protective layer is preferably made of a polymeric material having a high specific electric resistivity, e.g. of at least $10^{10}$ ohm.cm. Examples of suitable protective layers are polyimide layers described in U.S. Pat. No. 4,698,295.

In order to make the hydrophilic coloid binder layer(s) of the present photosensitive dye receptor material less permeable to water and less susceptible to mechanical damage the hydrophilic colloid binder such as gelatin may be post-hardened by a hardening agent known therefor in the art. Particularly suited hardening agents that may be applied already in the coating stage of said layer(s) are compounds containing a plurality of epoxy groups as described e.g. in DE-OS No. 29 35 354.

The adherence of the hydrophilic colloid layer(s) containing a mordanting agent to their support may be improved by the use of a proper subbing layer. For example, the adherence of hydrophilic colloid layers to a glass support is improved by a subbing layer on the basis of silicon compounds described in U.S. Pat. No. 3,661,584 and GB-P No. 1,286,467 or by adding said compounds to the hydrophilic colloid binder of the layer adjacent to the glass support. A particularly suited compound for that purpose called hereinafter silicon compound S has the following structural formula:

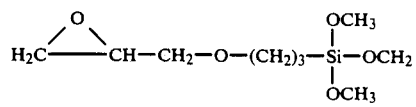

Suited subbing layer compositions for use in combination with hydrophobic resin supports, e.g. polyethylene terephthalate supports are described e.g. in U.S. Pat. Nos. 3,397,988, 3,649,336, 4,123,278 and 4,478,907.

The multicolour filter arrays prepared according to the present invention may be used in the form of a stripe filter array, e.g. applied in conjunction with a linear array of CCD photo-sensors (CCD stands for charge coupled device) or may be used in the form of a mosaic type array, e.g. applied in conjunction with an array or pattern of photo-diodes, or in conjunction with electrodes present in a liquid crystal display panel.

The following example illustrates the present invention without however, limiting it thereto.

All ratios, percentages and parts are by weight unless otherwise mentioned.

EXAMPLE

Preparation and composition of photosensitive dye receptor material

Onto a clean glass plate having a thickness of 1.5 mm the following coating composition was coated at 50 ml per m2:

- 650 g of an aqueous non-spectrally sensitized Lippmann type silverbromo-iodide (3 mole % iodide) emulsion containing silver halide grains the average grain size of which was 0.065 micron and wherein the silver halide was present in a concentration equivalent with 60 g of silver nitrate per kg of coating composition and gelatin was present in an amount corresponding with 1.3 g per 1 g of silver nitrate used in the silver halide preparation,
- 250 ml of a 20% solution of the polymeric mordanting agent prepared from 4,4'-diphenylmethane diisocyanate and N-ethyldiethanolamine quaternized with epichlorohydrine according to Example 1 of U.S. Pat. No. 4,186,014, and
- 120 ml of a gelatin hardening composition improving simultaneously the adherence of the coating composition to glass, which composition is an aqueous solution containing 4.8% of dimethylolamine and 5% of the already mentioned silicon compound S.

After drying the coated layer at room temperature it was ready for use in dye diffusion transfer processing as receptor material.

Exposure of dye diffusion transfer material

A sheet of a multicolour dye diffusion transfer material commercially available as COPYCOLOR CCN (COPYCOLOR is a registered trade name of Agfa-Gevaert N.V. Belgium) is contact exposed in a vacuum frame exposure apparatus using as original a multicolour pixel array on a glass support prepared e.g. by a technique described in U.S. Pat. No. 4,271,246. In the applied original individual rectangular red, green and blue pixels sizing 150 µm×300 µm are separated by a non-coloured contour line pattern having a width of 30 µm. The exposure was carried out with white light of a dose of 16 lux.second.

Diffusion transfer processing

The thus exposed multicolour diffusion transfer material was wetted at 20 ° C. at the exposed side with an aqueous processing solution having the following composition containing per liter the following ingredients:

| sodium hydroxide | 25 g |
| --- | --- |
| sodium orthophosphate | 25 g |
| cyclohexane dimethanol | 80 g |

-continued

| potassium iodide | 2 g |
| --- | --- |
| sodium thiosulphate | 2 g |
| 2,2-methylpropylpropane diole | 25 g |
| N-ethylbenzene-pyridinium chloride | 0.5 g |
| distilled water to make | 1000 ml |

After being wetted with the above liquid the exposed side of the multicolour diffusion transfer material was pressed for 2 minutes at 20 ° C. into contact with the above prepared photosensitive dye receptor materal applying pressure with a soft roller, said procedure being applied in the absence of light.

The photographic dye diffusion transfer material being developed with developing agents contained therein as exemplified in the preparation of photographic material of U.S. Pat. No. 4,605,613 was peeled apart from the receptor material whereon a multicolour mosaic image of blue, green and red pixels was formed delineated by a clear non-coloured contour pattern.

Exposure to contour line pattern of the above prepared photosensitive dye receptor material Under safelight conditions a photographically prepared mask (developed silver halide film of the lith-type) containing a light-transmissive pattern corresponding with the clear contour line pattern obtained in the photosensitive dye receptor material was laid in register therewith and the receptor material was exposed through the correctly positioned mask with white light corresponding with a dosis of lux.second.

Proccessing of the photo-exposed dye receptor material containing already colour pixels of dyes deposited therein by the dye diffusion transfer processing described hereinbefore The dye receptor material after exposure through the above defined contour line pattern was developed for 3 minutes at 20 ° C. in a black-and-white developer having the following composition:

| sodium hexametaphophate | 2 g |
| --- | --- |
| sodium sulphite | 10 g |
| sodium carbonate | 25 g |
| potassium bromide | 2 g |
| hydroquinone | 6 g |
| 1-phenyl-4-methyl-pyrazolidin-3-one | 0.5 g |
| water up to | 1 l |

After development the dye receptor material was fixed in a common fixing liquid on the basis of sodium thiosulphate, rinsed and dried.

As illustrated in FIG. 1 by top view a multicolour filter array containing red (1) green (2) and blue (3) pixels delineated by a black contour line pattern (4) was obtained.

Figure 2:
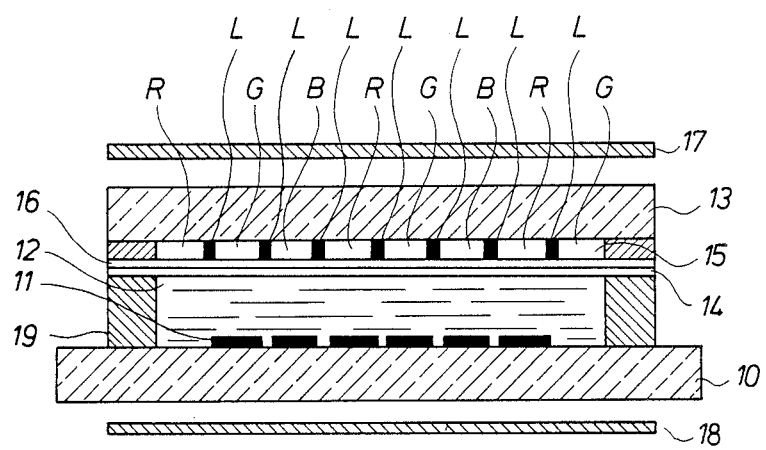
FIG. 2 represents a schematical cross-sectional view of a full-colour matrix liquid crystal display including a multicolour mosaic type filter array produced according to the present invention.

As illustrated by sectional view in FIG. 2 the above prepared filter colour array was used in a LCD full-colour device.

In said FIG. 2 a first glass plate 10 is coated with:

(1) a matrix of pixel electrodes 11 each individually connected with a polysilicon thin-film transistor (TFT not shown in the drawing), (2) a liquid crystal layer 12 of the twisted nematic type (TN), and a second glass plate 13 being coated at the side directed towards the first glass plate 10 with:

(i) a multi-colour filter array 15 produced according to the present invention containing red R, green G and blue B areas separated by a black contour line L, (ii) a protective waterimpermeable layer 16,
(iii) a common continuous transparent electrode 14, e.g. made of vapour deposited indium tin oxide (ITO).

A spacer element 19 defines the overall gap-width and keeps the liquid crystal layer 12 containing liquid crystals of the twisted nematic type (TNT) in the gap between the electrodes 11 and 14.

The aligning layers for producing the spiral staircase pattern orientation of the liquid crystal molecules of the nematic type are not shown in the drawing but are arranged on the opposing sides of the electrodes.

Polarizer layers 17 and 18 are arranged as outermost elements having their polarizing plane parallel whereby they operate the display in the so-called reverse contrast mode wherein the areas corresponding in "ON" state with energized electrode pixels transmit light and the areas corresponding in "OFF" state with non-energized electrode pixels block that light (ref. published EP-A No. 0 179 922).

We claim:

1. A method for the production of a multicolour filter array or mosaic wherein individual colour pixels are delineated by a light absorbing contour pattern, which method comprises the steps of:
   (1) providing a photosensitive dye receptor material being a photographic silver halide emulsion material incorporating at least one waterpermeable silver halide emulsion layer on a support,
   (2) depositing pixelwise different dyes or dye precursor compounds onto said photosensitive dye receptor material,
   (3) photo-exposing said at least one silver halide emulsion layer of said photosensitive dye receptor material to a light pattern resulting in a latent image in the form of a contour line pattern delineating the individual colour pixels obtained by deposition of said dyes on said photosensitive dye receptor material, and
   (4) developing said latent image to form in said dye receptor material an image representing a light-absorbing contour line pattern delineating the individual colour pixels obtained by deposition of said dyes in said dye receptor material.

2. Method according to claim 1, wherein the photosensitive dye receptor material contains a mordanting agent suited for fixing mordantable dyes in said silver halide emulsion layer and/or in another layer in waterpermeable relationship therewith.

3. Method according to claim 2, wherein the pixelwise deposition of said mordantable dyes in said photosensitive dye receptor material proceeds by contacting the layer(s) of said dye receptor material containing a mordanting agent(s) with a pixelwise exposed dye diffusion transfer material comprising a plurality of differently spectrally sensitized silver halide emulsion layers each of which is associated with a different dye-releasing compound the dye release and diffusion transfer of released dye is controlled by the development in alkaline aqueous medium of pixelwise photo-exposed silver halide in said dye diffusion transfer material.

4. Method according to claim 3, wherein dye release proceeds from reducible dye-releasing quinonoid compounds which after reduction can undergo a dye release with an intermolecular nucleophilic displacement reaction or elimination reaction and wherein the dye release is controlled by the development of a negative-working or direct-positive working silver halide emulsion layer.

5. Method according to claim 3, wherein the formation of colour pixels in the primary colours: blue, green and red in the dye receptor material proceeds by mixing a cyan dye, magenta dye and yellow dye released by different dye releasing compounds of said dye diffusion transfer material.

6. Method according to claim 3, wherein for the production of a multicolour pixel array a multicolour dye diffusion transfer material is used that comprises a support carrying (1) a red-sensitive silver halide emulsion layer having operatively associated therewith a dye-releasing compound that is initially immobile in an alkali-permeable colloid medium and wherefrom through the reducing action of a silver halide developing agent and alkalinity a cyan dye is split off in diffusible state, (2) a green-sensitive silver halide emulsion layer having operatively associated therewith a compound wherefrom a magenta dye is split off in diffusible state, and (3) a blue-sensitive silver halide emulsion layer having operatively associated therewith a compound wherefrom a yellow dye is split off in diffusible state.

7. Method according to claim 1, wherein the silver halide in the photographic dye receptor material is silver halide of a Lippmann type emulsion wherein the average grain size of the silver halide is at most 0.1 micron.

8. Method according to claim 2, wherein the mordanting agent is a diffusion resistant polymeric ionic compound.

9. Method according to claim 3, wherein the exposure of the multicolour dye diffusion transfer material proceeds in a single step through a multicolour pixel pattern containing a mosaic of blue, green and red pixels.

10. Method according to claim 3, wherein the exposure of the multicolour dye diffusion transfer material proceeds in three steps using a shiftable mask, wherein in a first step a pattern-wise exposure is made through said mask having apertures corresponding with the areas that are intended for dye release in dye diffusion transfer processing for recording one primary colour and for the following two exposures intended for recording succesively two other primary colours the mask is shifted each time in one direction within a distance corresponding with the length of one side of the aperture plus optionally the width of a contour line so that in the successive exposures adjacent areas are exposed so that finally in a one step dye diffusion transfer processing a mosaic pattern of blue, green and red pixel areas is produced in the photosensitive dye receptor material.

11. Method according to claim 3, wherein for each exposure a different mask is used and the different exposures are carried out in register with respect to the photographic dye diffusion transfer material to obtain after the different exposures by a one step dye diffusion transfer processing a desired pattern of differently coloured areas being directly adjacent to each other or separated by a more or less wide contour line having no colour in the photosensitive dye receptor material.

12. Method according to claim 3, wherein the pixelwise exposure or exposures of the photographic dye diffusion transfer material is (are) made through a mask having larger apertures than the size of the intended colour pixel areas in the photosensitive dye receptor material and a certain width of the border part of each colour pixel is covered with said light absorbing contour line pattern leaving free a central zone of more equal colour density.

* * * * *